(12) United States Patent
Weisse et al.

(10) Patent No.: US 6,473,289 B1
(45) Date of Patent: Oct. 29, 2002

(54) VACUUM VARIABLE CAPACITOR

(75) Inventors: Robert E. Weisse, San Jose, CA (US); Stephen E. Hilliker, Bonita, CA (US)

(73) Assignee: Paralax, LLC, Santa Clara, CA (US)

( * ) Notice: Subject to any disclaimer, the term of this patent is extended or adjusted under 35 U.S.C. 154(b) by 0 days.

(21) Appl. No.: 09/690,699

(22) Filed: Oct. 16, 2000

Related U.S. Application Data

(60) Provisional application No. 60/159,649, filed on Oct. 16, 1999.

(51) Int. Cl.$^7$ ................................................. H01G 7/00
(52) U.S. Cl. ................... 361/283.1; 361/278; 361/279; 361/283.3; 361/296; 361/292
(58) Field of Search ............................... 361/283.1, 277, 361/289, 279, 283.3, 278, 296, 272, 292, 298

(56) References Cited

U.S. PATENT DOCUMENTS

| | | | |
|---|---|---|---|
| 3,242,397 A | 3/1966 | Jennings | 317/245 |
| 3,257,590 A | 6/1966 | Hansen | 317/245 |
| 3,270,259 A | 8/1966 | Oeschger | 317/243 |
| 3,366,852 A | 1/1968 | Goetzl | 317/245 |
| 3,496,431 A | 2/1970 | Goetzl | 317/245 |
| 3,541,405 A | 11/1970 | Oeschger | 317/245 |
| 3,571,677 A | 3/1971 | Oeschger | 317/243 |
| 3,576,480 A * | 4/1971 | Barton | 317/245 |
| 4,002,957 A | 1/1977 | Weisbrod | 317/245 |
| 4,007,406 A | 2/1977 | Weisbrod | 317/245 |
| 4,035,697 A | 7/1977 | Arnold, Jr. | 361/289 |
| 4,177,495 A * | 12/1979 | Perret | 361/279 |
| 4,312,025 A * | 1/1982 | Boyer | 361/289 |
| 4,415,949 A * | 11/1983 | Blickstein | 361/296 |
| 4,879,627 A | 11/1989 | Grantham | 361/283 |
| 4,952,768 A | 8/1990 | Mohri et al. | 219/69 |
| 6,064,559 A * | 5/2000 | Church, Jr. | 361/277 |
| 6,268,995 B1 * | 7/2001 | Beuerman et al. | 361/277 |

FOREIGN PATENT DOCUMENTS

JP 06204082 7/1994

OTHER PUBLICATIONS

"High Voltage Vacuum and Gas Capacitors," Jennings Technology Catalog CAP–106, Apr. 1996.

* cited by examiner

Primary Examiner—Chau N. Nguyen
Assistant Examiner—Nguyen T Ha
(74) Attorney, Agent, or Firm—David R. Graham

(57) ABSTRACT

An improved vacuum variable capacitor can include one or more characteristics that provide advantages over previous vacuum variable capacitors. In particular, the vacuum variable capacitor can be constructed so as to enable the capacitance to be adjusted more easily, reduce parasitic electrical characteristics that degrade the performance of the vacuum variable capacitor, increase the strength of the capacitor plates of the vacuum variable capacitor, reduce the size of the vacuum variable capacitor, and/or make the shape of the vacuum variable capacitor more easily integrated into a system of which the vacuum variable capacitor is part.

17 Claims, 2 Drawing Sheets

VACUUM VARIABLE CAPACITOR

This application claims benefit of Provisional Application Ser. No. 60/159,649 filed Oct. 16, 1999.

BACKGROUND OF THE INVENTION

1. Field of the Invention

This invention relates to vacuum variable capacitors.

2. Related Art

Vacuum variable capacitors are used in a variety of applications in a variety of industries. For example, vacuum variable capacitors are used in RF matching devices to vary capacitance as part of tuning the RF impedance.

FIG. 1 is a cross-sectional view of a previous vacuum variable capacitor 100. Each of two opposed capacitor plate structures 102 and 103 include a mounting plate 102b or 103b, respectively, having formed thereon a multiplicity of concentric cylindrical capacitor plates 102a or 103a, respectively. (In the following description, the reference numerals 102a and 103a can refer to one or multiple capacitor plates.) The capacitor plates 102a and 103a are formed on the mounting plates 102b and 103b, respectively, at locations and with a spacing such that, as shown in FIG. 1, the capacitor plate structures 102 and 103 can be positioned with respect to each other to cause capacitor plates 102a of the capacitor plate structure 102 to fit between adjacent capacitor plates 103a of the capacitor plate structure 103 (and vice versa) so that a desired spacing ("gap distance") between adjacent capacitor plates 102a and 103a results. The capacitor plate structures 102 and 103 are electrically connected to a voltage source so that the adjacent capacitor plates 102a and 103a act as a capacitor.

The capacitor plate structures 102 and 103 are positioned in a housing 101. The capacitor plate structure 103 is attached to the housing 101 so that the position of the capacitor plate structure 103 remains fixed with respect to the housing 101. As explained further below, the capacitor plate structure 102 is attached to the housing 101 so that the position of the capacitor plate structure 102 can move with respect to the housing 101.

An end of a hollow shaft 104 is attached to the, capacitor plate structure 102. A female threaded member 109 is attached to an end of the shaft 104 opposite the end attached to the capacitor plate structure 102. A male threaded member 105 is screwed into the threaded member 109. The threaded member 105 is attached to an adjustment, head 108 which is, in turn, attached to the housing 101 so that the adjustment head 108 and threaded member 105 are held in place with respect to the housing 101 along a longitudinal axis 110 of the vacuum variable capacitor 100. Rotating the adjustment head 108 causes the threaded member 105 to move into or out of the threaded member 109, causing corresponding motion of the threaded member 109, shaft 104 and capacitor plate structure 102 (including associated capacitor plates 102a) with respect to the housing 101 along the longitudinal axis 110. Since the position of the capacitor plate structure 103 with respect to the housing 101 is fixed, the adjustment head 108 can therefore be used to change the relative positions of the capacitor plates 102a and 103a, thereby adjusting the capacitance between the capacitor plates 102a and 103a, as known to those skilled in the art.

A bellows 106 surrounds the shaft 104. A bearing 107 enables the shaft 104 to rotate relative to the bellows 106 and the housing 101. The housing 101, bearing 107, bellows 106 and mounting plate 102b form a sealed enclosure, held at a vacuum pressure, within which the capacitor plates 102a and 103a are positioned. The bellows 106 expands and contracts as necessary to allow movement of the threaded member 109, bearing 107, shaft 104 and capacitor plate structure 102 along the longitudinal axis 110. The bellows 106 also provides an electrical connection from the capacitor plate structure 102 to complete the electrical circuit including the capacitor formed by the capacitor plates 102a and 103a.

The above-described vacuum variable capacitor 100 is illustrative of previous vacuum variable capacitors. (Variations exist: for example, in another type of previous vacuum variable capacitor, the capacitor plates are formed as spirals, rather than as concentric cylinders as in the vacuum variable capacitor 100.) The vacuum variable capacitor 100 has a number of characteristics which can be undesirable.

The structure for effecting movement of the capacitor plate structure 102 is subject to mechanical friction which can cause adjustment of the capacitance to take an undesirably long time and/or require an undesirably large amount of power. Additionally, movement of the capacitor plate structure 102 may be opposed by a force due to the differential pressure between the vacuum pressure within the sealed enclosure and the atmospheric pressure outside of the sealed enclosure. The necessity of overcoming this force can further cause adjustment of the capacitance to take an undesirably long time and/or require an undesirably large amount of power. Illustratively; in the vacuum variable capacitor 100, capacitance can be adjusted at a rate of about 200 picofarads per second.

As indicated above, the bellows 106 provides an electrical connection from the capacitor plate structure 102 (i.e., from the capacitor represented by the capacitor plates 102a and 103a) to complete the electrical circuit of which the capacitor is part. However, the bellows 106 has associated therewith a parasitic inductance and resistance which degrades the performance of the capacitor.

The capacitor plate structures 102 and 103 are typically made by brazing the capacitor plates 102a or 103a on to the corresponding mounting plate 102b or 103b. The brazing process softens the material (typically copper) of which the capacitor plates 102a and 103a are made. This can make the capacitor plates 102a and 103a undesirably susceptible to deformation that degrades the performance of the vacuum variable capacitor 100 or renders the vacuum variable capacitor 100 unusable.

The size of the vacuum variable capacitor 100 along the longitudinal axis 110 may be larger than desired for some applications. (For convenience, the overall size of the vacuum variable capacitor 100 in this dimension is referred to herein as the "length" of the vacuum variable capacitor 100.) For example, the presence of the bellows 106 adds to the length of the vacuum variable capacitor 100. The shape of the capacitor plates 102a and 103a can also affect the length of the vacuum variable capacitor 100, as explained in more detail below with respect to the description of the invention.

The housing 101 of the vacuum variable capacitor 100 is cylindrical. In previous vacuum variable capacitors, the housing has been made cylindrical to avoid stress concentrations that may otherwise occur at corners of a rectangular housing as a result of the differential pressure between the vacuum pressure within the housing and the atmospheric pressure outside of the housing. However, while, for the reason given above, the use of a cylindrical housing may be desirable if only the construction of the vacuum variable capacitor is considered, the use of a cylindrical housing may not be desirable from the standpoint of a system with which the vacuum variable capacitor is to be used, since a cylindrical shape may not be as space-efficient as a rectangular shape when the vacuum variable capacitor is integrated with other components of the system.

SUMMARY OF THE INVENTION

A vacuum variable capacitor according to the invention can include one or more characteristics that provide advantages over previous vacuum variable capacitors. In particular, a vacuum variable capacitor according to the invention can be constructed so as to enable the capacitance to be adjusted more easily, reduce parasitic electrical characteristics that degrade the performance of the vacuum variable capacitor, increase the strength of the capacitor plates of the vacuum variable capacitor, reduce the size of the vacuum variable capacitor, and/or make the shape of the vacuum variable capacitor more easily integrated into a system of which the vacuum variable capacitor is part.

A vacuum variable capacitor according to the invention includes: i) a first capacitor plate structure including one or more capacitive surfaces; ii) a second capacitor plate structure including one or more capacitive surfaces; iii) apparatus for forming a sealed enclosure; and iv) apparatus for moving the first capacitor plate structure and/or the second capacitor plate structure. The sealed enclosure is held at vacuum pressure. The first and second capacitor plate structures are enclosed within the sealed enclosure and are positioned with respect to each other so that corresponding capacitive surfaces of the first and second capacitor plate structures are spaced apart from each other. The movement apparatus is adapted to move the first capacitor plate structure and/or the second capacitor plate structure, such that the spacing between corresponding capacitive surfaces of the first and second capacitor plate structures changes, thereby changing the capacitance of the vacuum variable capacitor.

In one embodiment of the invention, no part of the movement apparatus moves in opposition to a force due to a pressure differential between the inside and the outside of the sealed enclosure. This can be accomplished by enclosing all moving components of the movement apparatus within the sealed enclosure. The movement apparatus can be embodied by a coil and magnet electromagnetically coupled to each other, one of the coil or magnet movably mounted inside the sealed enclosure and connected to one of the first or second capacitor plate structures that is movably mounted, the other of the magnet and coil mounted outside of the sealed enclosure. Since no part of the movement apparatus moves in opposition to a force due to a pressure differential between the inside and the outside of the sealed enclosure, it is easier to move the capacitor plate structure(s) in a vacuum variable capacitor according to this embodiment of the invention than it has been to move a capacitor plate structure in a previous vacuum variable capacitor, thus making it easier (i.e., requiring less time and/or power) to effect a change in capacitance in the vacuum variable capacitor according to the invention than in the previous vacuum variable capacitor.

In another embodiment of the invention, the movement apparatus includes a coil and a magnet electromagnetically coupled to the coil. One of the magnet and coil is movably mounted inside the sealed enclosure, while the other is mounted outside of the sealed enclosure. The movement apparatus further includes apparatus for connecting the one of the magnet and coil that is inside the sealed enclosure to one of the first or second capacitor plate structures that is movably mounted, thereby enabling movement of the magnet or coil to effect corresponding movement of the first or second capacitor plate structure. In a further embodiment, the vacuum variable capacitor includes an electrically conductive partition positioned within the sealed enclosure to separate the first and second capacitor plate structures from the one of the magnet and coil that is movably mounted inside the sealed enclosure. The use of a coil and magnet enables the movable capacitor plate structure to be driven without use of threaded members in order to translate rotary motion to linear motion and without need to provide a bellows or movable vacuum seal; thus, much of the mechanical friction that may otherwise be associated with movement of the capacitor plate structure (as in previous vacuum variable capacitors) is eliminated, thereby eliminating the need for overcoming such friction when moving the capacitor plate structure and enabling capacitance to be changed more easily (i.e., to require less time and/or power). Further, positioning of the movable magnet or coil inside the sealed enclosure can preclude the need to overcome a force due to a pressure differential between the inside and the outside of the sealed enclosure, further increasing the ease with which the movable capacitor plate structure can be moved and capacitance correspondingly changed. Positioning of the movable magnet or coil inside the sealed enclosure can also eliminate the need to use a bellows to provide a flexible seal that maintains the vacuum pressure within the sealed enclosure while transmitting motion from a mechanical driving apparatus outside the sealed enclosure to the movable capacitor plate structure inside the sealed enclosure. The elimination of the bellows can enable the length of the vacuum variable capacitor to be reduced as compared to previous vacuum variable capacitors.

In yet another embodiment of the invention, the vacuum variable capacitor further includes a third capacitor plate structure including one or more capacitive surfaces. The first and third capacitor plate structures are positioned with respect to each other so that the capacitive surfaces of the third capacitor plate structure are spaced apart from corresponding capacitive surfaces of the first capacitor plate structure. The movement apparatus is adapted to move the first capacitor plate structure, the second capacitor plate structure and/or the third capacitor plate structure, such that the spacing between corresponding capacitive surfaces of the first and second capacitor plate structures and/or the first and third capacitor plate structures changes, thereby changing the capacitance of the vacuum variable capacitor. The use of two capacitor plate structures (the second and third capacitor plate structures) on one side of a gap across which capacitance is established eliminates the need to use a bellows or other moving conductive path to provide an electrical connection from the capacitor plate structure (the first capacitor plate structure) on the other side of the gap to complete the electrical circuit including the capacitor formed by the capacitor plates of the capacitor plate structures, since the two capacitor plate structures on one side of the gap provide the necessary two electrical connections from the single capacitor plate structure on the other side of the gap. Thus, the parasitic inductance and resistance associated with the bellows is eliminated.

In still another embodiment of the invention, the sealed enclosure is formed in a housing. The first and/or second capacitor plate structures are movably mounted in the sealed enclosure to enable movement along an axis. The housing has a rectangular cross-sectional shape in at least one plane that is perpendicular to that axis. In a further embodiment, the at least one plane includes a plane including the edges of the housing which extend farthest from a central axis of the vacuum variable capacitor. In another further embodiment, the movement apparatus includes a coil and a magnet electromagnetically coupled to each other, wherein the magnet and coil are mounted inside and/or around the housing, and the part of the housing within or around which the magnet and coil are mounted has a circular cross-sectional shape in at least one plane that is perpendicular to the axis along which the first and/or second capacitor plate structure can move. The use of a housing having a rectangular cross-sectional shape can enable the vacuum variable capacitor to be integrated more compactly together with other components of a system with which the vacuum variable capacitor is to be used, and can, depending upon the shape of components within the housing, enable a smaller housing and/or smaller system housing to be used.

In another embodiment of the invention, each of the first and second capacitor plate structures includes a mounting plate and one or more capacitor plates formed thereon. Each capacitor plate has opposed capacitive surfaces that each lie in a plane (i.e., the capacitor plates are "straight"). The use of capacitor plate structures with straight capacitor plates can be advantageous because such capacitor plate structures can be constructed using a relatively inexpensive form of electrical discharge machining (the use of which is advantageous for reasons discussed further below) known as wire electrical discharge machining.

In yet another embodiment of the invention, each of the first and second capacitor plate structures again includes a mounting plate and one or more capacitor plates formed thereon. However, in this embodiment, each capacitor plate has opposed capacitive surfaces that are each not perpendicular to the surface of the mounting plate on which the capacitor plate is mounted (i.e., the capacitive surfaces are "angled"). Since the capacitive surfaces of the capacitor plates are angled, moving the capacitor plate structures with respect to each other simultaneously varies both gap distance and capacitor plate overlap so that the capacitance varies more per unit of distance that the capacitor plate structures are moved relative to each other than would be the case if straight capacitive surfaces were used (as in previous vacuum variable capacitors). Consequently, capacitance can be varied more quickly. Additionally, a given amount of travel of the capacitor plate structures with respect to each other produces a larger change in capacitance, enabling a desired range of capacitance values to be achieved using capacitor plates having a smaller height, which, in turn, allows the length of the vacuum variable capacitor to be reduced.

In another embodiment of the invention, a capacitor plate structure is constructed by performing electrical discharge machining to form one or more capacitor plates on a mounting plate. In a further particular embodiment, wire electrical discharge machining is performed to form one or more capacitor plates having opposed capacitive surfaces that each lie in a plane (i.e., "straight" capacitor plates). In an alternative further particular embodiment, probe electrical discharge machining is performed to form one or more capacitor plates having opposed capacitive surfaces that each do not lie in a plane (i.e., "curved" capacitor plates). The use of electrical discharge machining to form a capacitor plate structure is advantageous because electrical discharge machining does not soften the material of which the capacitor plates are made as much as brazing, thereby making the capacitor plates more resistant to deformation and reducing the likelihood of damage to the capacitor plates that can degrade the performance of the vacuum variable capacitor or render the vacuum variable capacitor unusable.

DETAILED DESCRIPTION OF THE INVENTION

Figure 2A:
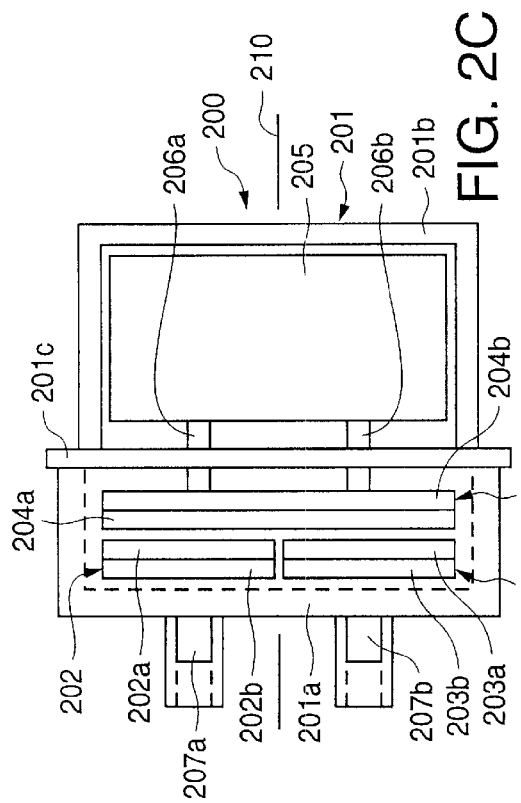
FIGS. 2A, 2B and 2C are an orthogonal set of cross-sectional views, taken along the sectional lines 2A—2A, 2B—2B and 2C—2C, respectively, of a vacuum variable capacitor according to the invention.
Figure 2B:
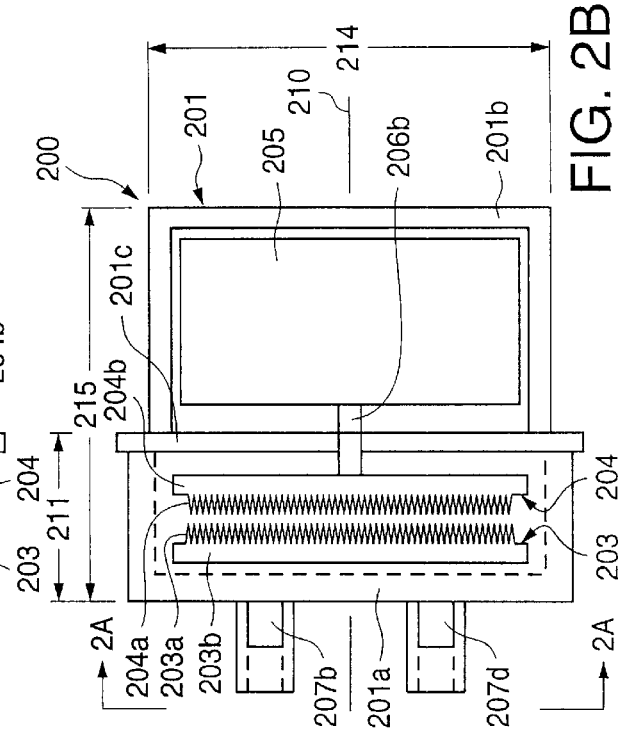
Figure 2C:
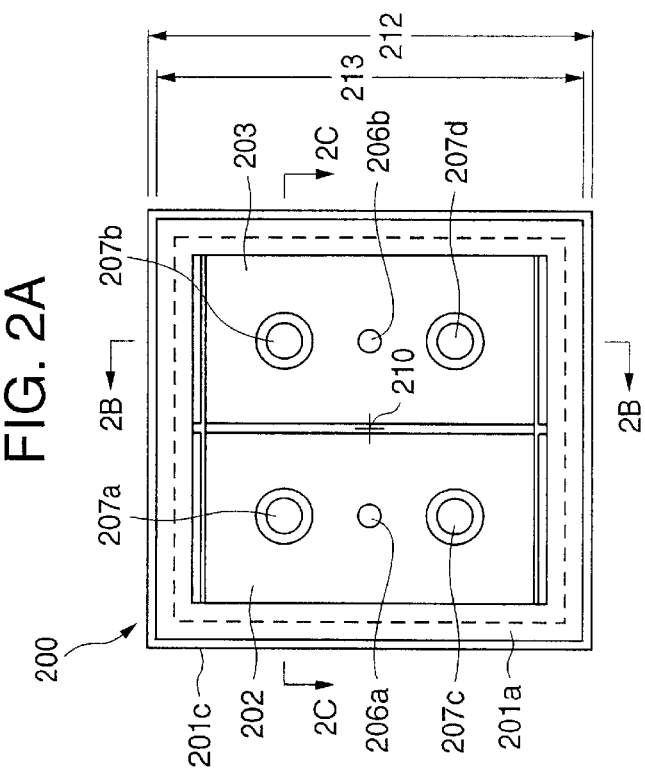

FIGS. 2A, 2B and 2C are an orthogonal set of crosssectional views, taken along the sectional lines 2A—2A, 2B—2B and 2C—2C, respectively, of a vacuum variable capacitor 200 according to the invention. (To increase the clarity of the illustration of the vacuum variable capacitor 200, the capacitor plate structures 202 and 203 are not shown with hidden lines in FIG. 2A.) As will be apparent from the description below, a vacuum variable capacitor according to the invention can overcome the above-described problems with previous vacuum variable capacitors.

First, second and third capacitor plate structures 202, 203 and 204 each include a plurality of capacitor plates 202a, 203a or 204a, respectively, formed on a mounting plate 202b, 203b or 204b, respectively. (In the following description, the reference numerals 202a, 203a and 204a can refer to one or multiple capacitor plates.) As described in more detail below, the capacitor plates 202a, 203a and 204a are formed such that the mounting plates 202b, 203b and 204b can be positioned with respect to each other to cause capacitor plates 202a and 203a to fit between adjacent capacitor plates 204a (and vice versa) so that the surfaces of capacitor plates 202a and 203a are adjacent to, and spaced apart from, surfaces of capacitor plates 204a. (Such surfaces are sometimes referred to herein as "capacitive surfaces" and the distance between adjacent capacitive surfaces normal to those surfaces is referred to herein as the "gap distance.") The capacitor plate structures 202, 203 and 204 can be constructed of materials (e.g., oxygen-free copper or copper-plated brass) conventionally used for such structures in a vacuum variable capacitor, as known to those skilled in the art. As described in more detail below, the capacitor plate structures 202, 203 and 204 can be constructed using a method in accordance with the invention that produces stronger capacitor plates 202a, 203a and 204a than those produced using previous conventional methods for forming capacitor plate structures.

The capacitor plate structures 202 and 203 and the capacitor plate structure 204 are positioned in a housing 201 which forms a sealed enclosure that is held at a vacuum pressure. The housing 201 includes a tail section 201a, a head section 201b and a partition 201c. The tail section 201a and head section 201b are made of any appropriate electrically insulative material (such as, for example, alumina), so that spurious electrical charge does not interfere with the operation of the components of the vacuum variable capacitor 200 within the tail section 201a and head section 201b. The partition 201c is made of an electrically conductive material (such as, for example, copper or copper-plated stainless steel), so that the partition 201c will act as an RF shield between the head section portion of the sealed enclosure (in which the amount of RF energy is preferably minimized, as will be clearer from the description below) and the tail section portion of the sealed enclosure (in which the amount of RF energy will be relatively large). The partition 201c can also be adapted to act as a mounting flange for mounting of the vacuum variable capacitor 200 on other apparatus, as discussed further below. The tail section 201a and head section 201b can be attached to the partition 201c using any appropriate technique (such as, for example, brazing).

Illustratively, in one embodiment of a vacuum variable capacitor according to the invention having a construction as shown for the vacuum variable capacitor 200 of FIGS. 2A, 2B and 2C, the distance 211 is about 1.5 inches, the distance 215 can vary between about 3.0 inches to about 3.5 inches (depending upon the particular implementation of the vacuum variable capacitor 200), the distance 212 is about 2.9 inches (viewed in the direction of FIG. 2A, the partition 201c has a square outline), the distance 213 is about 2.8 inches (viewed in the direction of FIG. 2A, the tail section 201a has a square outline), and the diameter 214 is about 2.4 inches.

Studs 207a, 207c and studs 207b, 207d are attached to, or formed as part of—using any appropriate conventional techniques, as can be appreciated by those skilled in the art—the mounting plates 202b and 203b of the capacitor plate structures 202 and 203, respectively. The studs 207a, 207b, 207c and 207d can be constructed of oxygen-free copper or other appropriate material. The studs 207a, 207b, 207c and 207d extend through corresponding holes formed through the tail section 201a of the housing 201. The ends of the studs 207a, 207b, 207c and 207d extending outside of the housing 201 are threaded. Corresponding threaded nuts are used to hold the studs 207a, 207b, 207c and 207d in, place with respect to the housing 201 so that the capacitor plate structures 202 and 203 are positioned at a predetermined fixed location along a longitudinal axis 210 (see FIGS. 2B and 2C) of the vacuum variable capacitor 200. (To facilitate the description below, it is assumed that the axis 210 extends through the center of the vacuum variable capacitor 200, as viewed in FIG. 2A.) To ensure the integrity of the vacuum within the housing 201, a seal is formed where the studs 207a, 207b, 207c and 207d extend through the housing 201 (by, for example, brazing the studs 207a, 207b, 207c and 207d to a metal formed on the housing 201 adjacent to the holes extending through the tail section 201a).

A magnet 205 is connected to the mounting plate 204b of the capacitor plate structure 204 by two shafts 206a and 206b which are journalled within corresponding holes formed through the partition 201c. The magnet 205 and shafts 206a and 206b are positioned together with the capacitor plate structure 204 in the housing 201. Attachment of the shafts 206a and 206b to the magnet 205 and to the capacitor plate structure 204 can be accomplished using any appropriate conventional techniques, as known to those skilled in the art. A coil (not shown in FIGS. 2A, 2B and 2C) is positioned around the exterior of the head section 201b of the housing 201, proximate to the magnet 205, so that the coil remains at a fixed position with respect to the housing 201. (The positioning of the coil can be accomplished using conventional techniques, as known to those skilled in the art.) As is well understood by those of skill in the art, an electrical current flowing through the coil can be varied to cause the magnet 205 to move along the longitudinal axis 210 of the vacuum variable capacitor 200. The magnet 205 and coil are made of any appropriate materials, a variety of conventional types of which are known to those skilled in that art. Thus, the coil and the magnet 205 can be used to cause motion of the capacitor plate structure 204 (and capacitor plates 204a) with respect to the housing 201 along the longitudinal axis 210. Since the position of the capacitor plate structures 202 and 203 with respect, to the housing 201 are fixed, the coil and the magnet 205 can therefore be used to change the positions of the capacitor plates 202a and 203a relative to the capacitor plates 204a, thereby adjusting the capacitance between the capacitor plates 202a and 203a and the capacitor plates 204a, as known to those skilled in the art.

Contact between the shafts 206a and 206b and the corresponding holes in the partition 201c holds the assembly including the magnet 205, capacitor plate structure 204 and shafts 206a and 206b in place to prevent translational motion perpendicular to the axis 210 and rotational motion about any axis perpendicular to the axis 210. The use of multiple shafts can provide enhanced stability of the magnet 205 and capacitor plate structure 204. Though two shafts are used in the vacuum variable capacitor 200 as depicted in FIGS. 2A, 2B and 2C, a single shaft or more than two shafts can also be used, the number of shafts being chosen in view of the tradeoff between enhanced stability of the magnet 205 and capacitor plate structure 204 and the increased manufacturing expense and the increased mass (weight) associated with the use of more shafts. Motion of the shafts 206a and 206b through the holes in the partition 201c is facilitated using, for example, a lubricant or a bearing fitted between the shafts 206a and 206b and the walls of the holes. It can be desirable to construct the shafts 206a and 206b of an electrically insulative material (e.g., alumina) to minimize or eliminate conduction of electrical charge to the magnet 205 that may otherwise interfere with operation of the coil and the magnet 205 as described above.

Figure 1:
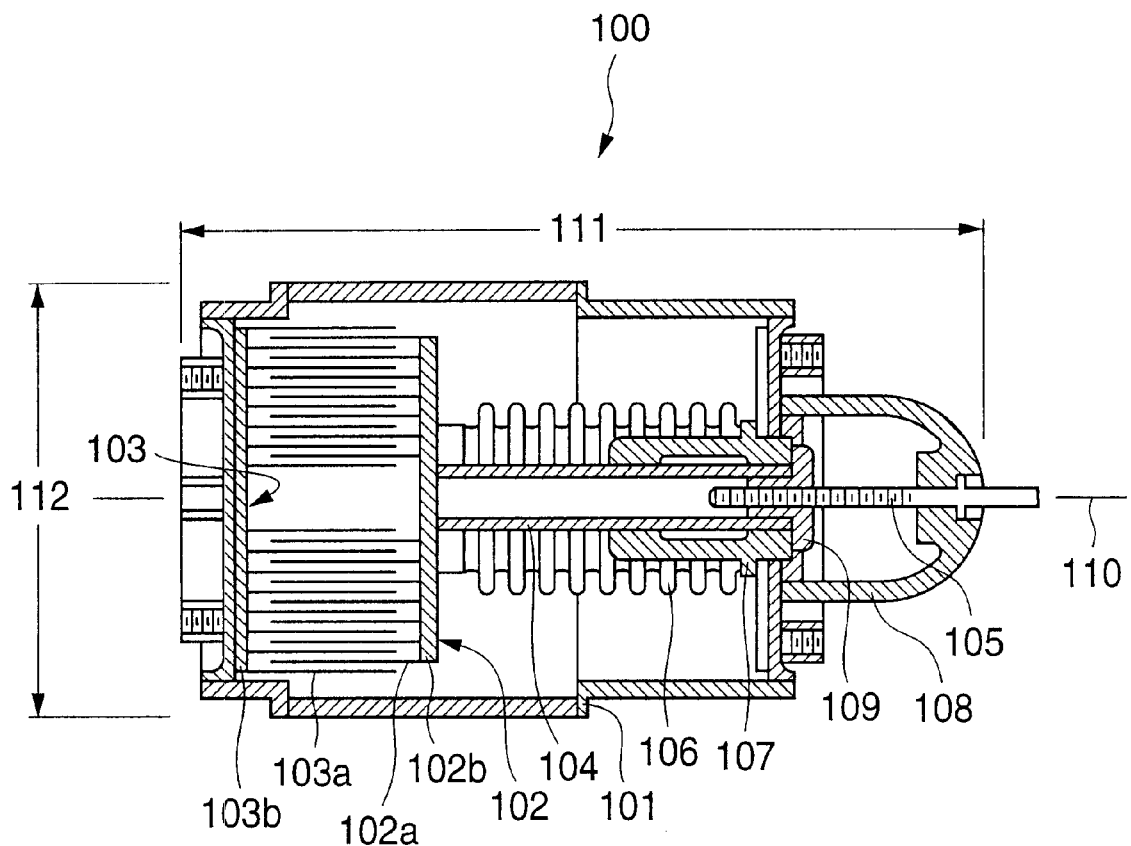
FIG. 1 is a cross-sectional view of a previous vacuum variable capacitor.

In the previous vacuum variable capacitor 100 described above with respect to FIG. 1, adjustment of the capacitance can take an undesirably long time and/or require an undesirably large amount of power because of mechanical friction attendant operation of the structure for moving the capacitor plate structure 102, and because motion of the capacitor plate structure 102 may be opposed by a force due to the differential pressure between the vacuum pressure within the sealed enclosure and the atmospheric pressure outside of the sealed enclosure. In contrast, in the vacuum variable capacitor 200, movement of the capacitor plate structure 204 can be effected without use of threaded members in order to translate rotary motion to linear motion and without need to provide a bellows or movable vacuum seal, thus eliminating much of the mechanical friction that may otherwise be associated with movement of the capacitor plate structure 204 and thereby eliminating the need for overcoming such friction when moving the capacitor plate structure 204. Further, in the vacuum variable capacitor 200, all of the structure that must be moved in order to effect movement of the capacitor plate structure 204 (i.e., the capacitor plate structure 204, the magnet 205 and the shafts 206a and 206b) is within the sealed enclosure held at vacuum pressure, so that none of the movable structure must overcome a force due to differential pressure across a part of the structure, thus making it easier to move the capacitor plate structure 204 in the vacuum variable capacitor 200 than it is to move the capacitor plate structure 102 in the previous vacuum variable capacitor 100. For the above reasons, it is easier (i.e., requires less time and/or power) to effect a change in capacitance in the vacuum variable capacitor 200 than in the previous vacuum variable capacitor 100.

As shown in FIGS. 2A, 2B and 2C, in the vacuum variable capacitor 200, the magnet 205 is positioned in the housing 201 and the coil is positioned outside the housing 201. Alternatively, a coil can be positioned in the housing 201 and connected to the mounting plate 204b of the capacitor plate structure 204 by the shafts 206a and 206b. Attachment of the coil to the shafts 206a and 206b can be accomplished using any appropriate conventional techniques, as known to those skilled in the art. One or more magnets can be positioned adjacent to the exterior of the head section 201b of the housing 201, proximate to the coil, so that the magnet(s) remain fixed in position with respect to the housing 201. By varying an electrical current flowing through the coil, the coil can be caused to move in a direction along the longitudinal axis 210 of the vacuum variable capacitor 200, thus causing motion of the capacitor plate structure 204 (and capacitor plates 204a) with respect to the housing 201 along the longitudinal axis 210 and thereby enabling adjustment of the capacitance between the capacitor plates 202a and 203a and the capacitor plates 204a. Such a structure—like the structure shown in FIGS. 2A, 2B and 2C in which the magnet 205 is within the housing 201 and the coil is outside the housing 201—makes it easier to move the capacitor plate structure 204 in the vacuum variable capacitor 200 than it is to move the capacitor plate structure 102 in the previous vacuum variable capacitor 100 because of a reduction in mechanical friction associated with the structure for driving the capacitor plate structure 204, and because of elimination of any need to overcome the differential pressure between the vacuum pressure inside the sealed enclosure and the atmospheric pressure outside the sealed enclosure. Additionally, since the coil of a magnet and coil combination typically has a smaller mass than the magnet(s), such a structure can make it even easier (as compared to the structure shown in FIGS. 2A, 2B and 2C) to move the capacitor plate structure 204 because of the smaller mass that must be driven by the driving apparatus.

A variety of other structures can also be used to effect movement of the capacitor plate structure 204. For example, a shaft can be attached to the capacitor plate structure 204 and extend through a hole formed through the head section 201b, a seal enabling movement of the shaft and sealing the enclosure within the housing 201. The end of the shaft outside of the housing 201 can be threaded and mate with a corresponding threaded portion of an adjustment member that is fixed with respect to the housing 201, such that rotation of the adjustment member causes the shaft (and, thus, the capacitor plate structure 204) to move along the axis 210, thereby enabling variation in the capacitance of the vacuum variable capacitor 200. Such a structure enables the capacitor plate structure 204 to be moved more easily than the capacitor plate structure 102 of the vacuum variable capacitor 100, since it is not necessary to overcome a force due to differential pressure between the vacuum pressure within the sealed enclosure and the atmospheric pressure outside the sealed enclosure. Alternatively, rather than using a threaded shaft and adjustment member, movement of the shaft along the axis 210 could be driven by a motor. Or, a magnet and coil, or a piezoelectric actuator, could be positioned within the housing 201 and connected to the capacitor plate structure 204, an electrical connector (e.g., wire) passing through a hole in the housing 201 to make connection to the coil or actuator and supply electrical power thereto, changes in electric current driving motion of the magnet, coil or actuator and producing corresponding movement of the capacitor plate structure 204. (The piezoelectric actuator can also be constructed so that actuation can be effected using a magnetic energy source positioned outside the housing 201.) The latter two structures, in particular, enable the capacitor plate structure 204 to be moved even more easily, since mechanical friction associated with other structures for driving movement of the capacitor plate structure 204 is reduced. However, in the structures described in this paragraph, it may be difficult to provide an adequate seal about the shaft or electrical connector at the point where the shaft or electrical connector exits the housing 201.

In the vacuum variable capacitor 200 there is no need to provide a bellows as in the previous vacuum variable capacitor 100 described above with respect to FIG. 1. The use of the magnet 205 and associated coil to drive the capacitor plate structure 204 obviates use of a bellows to provide a flexible seal that maintains the vacuum pressure within the sealed enclosure while transmitting motion from a mechanical driving apparatus outside the sealed enclosure to the movable capacitor plate structure inside the sealed enclosure. Further, the use of two capacitor plate structures 202 and 203 on one side of a gap across which capacitance is established (compare capacitor plate structures 202 and 203 of vacuum variable capacitor 200 to capacitor plate structure 103 of vacuum variable capacitor 100) obviates use of the bellows or other moving conductive path to provide an electrical connection from the movable capacitor plate structure 204 to complete the electrical circuit including the capacitor formed by the capacitor plates of the capacitor plate structures 202, 203 and 204, since the capacitor plate structures 202 and 203 provide the necessary two electrical connections from the movable capacitor plate structure 204.

The elimination of the bellows can provide several advantages. First, the parasitic inductance and resistance associated with the bellows is eliminated. Additionally, the size of the vacuum variable capacitor 200 in the dimension parallel to the longitudinal axis 210 of the vacuum variable capacitor 200 can be reduced as compared to previous vacuum variable capacitors providing similar functionality. (For convenience, the overall size of the vacuum variable capacitor 200 in this dimension is referred to herein as the "length" of the vacuum variable capacitor 200.) For example, in a previous vacuum variable capacitor having particular specified electronic characteristics and a construction similar to that of the vacuum variable capacitor 100 of FIG. 1, the dimension 111 (see FIG. 1), i.e., the length of the vacuum variable capacitor 100, can vary between 4.33 inches and 9.25 inches, depending upon the particular implementation of the vacuum variable capacitor. (The largest diameter of the vacuum variable capacitor, i.e., a distance corresponding to the distance 112 in FIG. 1, ranges from 1.77 inches (for the vacuum variable capacitor having a length of 4.33 inches) to 3.46 inches (for the vacuum variable capacitor having a length of 9.25 inches)). In comparison, in a vacuum variable capacitor according to the invention having comparable electronic characteristics and a construction as shown for the vacuum variable capacitor 200 of FIGS. 2A, 2B and 2C, the distance 211 (which encompasses functionality comparable to that embodied by the vacuum variable capacitor 100) is about 1.5 inches. The distance 215, i.e., the length of the vacuum variable capacitor 200, can vary between about 3.0 inches to about 3.5 inches, depending upon the particular implementation of the vacuum variable capacitor 200. A motor that provides functionality similar to that of the magnet 205 and coil of the vacuum variable capacitor 200 is provided external to the vacuum variable capacitor 100 (i.e., is not part of the vacuum variable capacitor 100) and is not shown in FIG. 1; thus, to the extent that the presence of the magnet 205 and coil increase the length of the vacuum variable capacitor 200, they do so in such a way as to reduce the size and number of external parts (i.e., motor) that must be employed to operate the vacuum variable capacitor 200 (i.e., they minimize the additional space needed for the system of which the vacuum variable capacitor 200 is part).

As indicated above, the partition 201c is made of an electrically conductive material so that the partition 201c will act as an RF shield between the head section portion of the sealed enclosure (in which the magnet 205 is situated) and the tail section portion of the sealed enclosure (in which the capacitor is situated). The RF shielding effect produced by the partition 201c enables the magnet 205 to be positioned closer to the capacitor (in particular, to the capacitor plate structure 204), without detrimental effect on the operation of the capacitor or the combination of the magnet 205 and coil, than would otherwise be the case if the partition 201c was not present. Further, the partition 201c can itself be made relatively thin. Thus, the partition 201c enables the vacuum variable capacitor 200 to be reduced in length. Additionally, the housing 201 can be constructed so that the partition 201c extends farther from the axis 210 than other parts of the housing 201, enabling the partition 201c to be used as a mounting flange for mounting the vacuum variable capacitor 200 to other components of a system with which the vacuum variable capacitor is used, as indicated above. This can be particularly advantageous if the partition 201c is mounted to contact another system component or components that also act as an RF shield, since the partition 201c can then be used to complete an RF shielding encasement provided by other system components.

It can be desirable to match the size of the magnet 205 and the size of the interior of the head section 201b of the housing 201, in a plane perpendicular to the axis 210, so that the magnet 205 abuts the interior surface of the head section 201b. In such case, the head section 201b is made of a material, or the interior surface of the head section 201b is coated with a material, that provides a bearing surface enabling the magnet 205 to move freely along the axis 210. Matching the size of the magnet 205 and the size of the interior of the head section 201b of the housing 201 enables either the size of the head section 201b to be reduced (thus reducing the exterior size of the vacuum variable capacitor 200) or the size of the magnet 205 to be increased (thus enabling greater driving power to be supplied for movement of the capacitor plate structure 204).

Though not shown in FIGS. 2A, 2B and 2c, it can be desirable to form one or more stops on one or more interior surfaces of the housing 201 that limit the range of travel of the magnet 205 and/or the capacitor plate structure 204. For example, it may be desirable to position a stop on the housing 201 so that the magnet 205 and/or the capacitor plate structure 204 cannot move to a position that would cause contact between the capacitor plates 202a and 203a and the capacitor plates 204a. Similarly, it may be may be desirable to position a stop on the housing 201 so that the magnet 205 and/or the capacitor plate structure 204 cannot move to a position that would cause contact between the magnet 205 and the interior surface of the head section 201b perpendicular to the axis 210, or to a position that would cause contact between the capacitor plate structure 204 and the partition 201c. Each of these stops may be desirable to prevent damage that may otherwise occur to the contacting structures. It may also be desirable to position one or more stops on the housing 201 to prevent the magnet 205 and/or the capacitor plate structure 204 from moving beyond position(s) that result in a desired minimum and/or maximum spacing between the capacitor plate structure 204 and the capacitor plate structures 202 and 203.

As depicted in FIG. 2B, each of the capacitor plates 202a, 203a and 204a is formed so that the capacitive surfaces of the capacitor plate 202a, 203a or 204a are angled slightly from parallel to the direction of motion of the capacitor plate structures 202, 203 and 204. (For convenience, such capacitive surfaces are referred to hereinafter as "angled capacitive surfaces" or "tapered capacitive surfaces.") In contrast, as indicated above, the capacitive surfaces of capacitor plates of previous vacuum variable capacitors have been made parallel to the direction of motion of the capacitor plate structures. (For convenience, such capacitive surfaces are referred to hereinafter as "straight capacitive surfaces.") Using angled capacitive surfaces, rather than straight capacitive surfaces, can provide several advantages, as explained further below.

The capacitance of a vacuum variable capacitor as described above can be varied by, for example, changing the gap distance between adjacent capacitor plates of different capacitor plate structures, or by changing the amount of overlapping area (referred to herein as the "capacitor plate overlap") of adjacent capacitive surfaces of capacitor plates of different capacitor plate structures (when viewed in a direction perpendicular—or substantially perpendicular—to the capacitive surfaces). (Generally, capacitance increases with decreasing gap distance and with increasing capacitor plate overlap, and decreases with increasing gap distance and with decreasing capacitor plate overlap.) In previous vacuum variable capacitors, in which capacitor plates having straight capacitive surfaces are used, the gap distance is established during construction of the vacuum variable capacitor (and cannot be varied during operation of the vacuum variable capacitor), and capacitance is varied by moving the capacitor plate structures with respect to each other to change the capacitor plate overlap (e.g., in the vacuum variable capacitor 100 of FIG. 1, by moving the capacitor plate structure 102 along the axis 110). In contrast, since the capacitive surfaces of the capacitor plates 202a, 203a and 204a of the vacuum variable capacitor 200 are angled, moving the capacitor plate structure 204 with respect to the capacitor plate structures 202 and 203 simultaneously varies both the gap distance and the capacitor plate overlap (either increasing the gap distance and decreasing the capacitor plate overlap, or decreasing the gap distance and increasing the capacitor plate overlap). As a result, capacitance varies more per unit of distance that the capacitor plate structures 202, 203 and 204 are moved relative to each other, and, therefore, capacitance can be varied more quickly than would be the case if the capacitive surfaces were straight. (The change in capacitance per unit of distance that the capacitor plate structures 202, 203 and 204 are moved relative to each other produces a third order effect on the speed of capacitance adjustment.) Additionally, a given amount of travel of the capacitor plate structure 204 along the axis 210 produces a larger change in capacitance than would be the case if the capacitive surfaces of the capacitor plates 202a, 203a and 204a were straight. Consequently, a desired range of capacitance values can be achieved using capacitor plates 202a, 203a and 204a that extend from the corresponding mounting plate 202b, 203b or 204b (for convenience, this extension is referred to herein as the "height" of the capacitor plates) by a smaller amount than would be the case if the capacitive surfaces were straight. This allows the length of the vacuum variable capacitor 200 to be reduced.

Further, in a vacuum variable capacitor according to the invention, the gap distance can typically be made smaller than has been the case in previous vacuum variable capacitors. Using a smaller gap distance can provide several advantages.

For example, using a smaller gap distance can reduce the length of the vacuum variable capacitor 200. Because the capacitive surfaces of the capacitor plates 202*a*, 203*a* and 204*a* are angled, reducing the gap distance coincides with a larger capacitor plate overlap and, thus, capacitance. Consequently, if the gap distance is reduced, the capacitor plate overlap (and, thus, the height of the capacitor plates 202*a*, 203*a* and/or 204*a*) can be reduced while maintaining the same capacitance, thereby enabling reduction in the length of the vacuum variable capacitor 200. Further, in the vacuum variable capacitor 200, reducing the height of the capacitor plates 204*a* can enable the capacitance to be changed more quickly: the decrease in height of the capacitor plates 204*a* reduces the mass of the capacitor plates 204*a*, thus enabling the capacitor plate structure 204 to be moved to a desired position more quickly. (The reduction in mass produces a first order effect on the speed of capacitance adjustment.)

At vacuum pressures typically used in a vacuum variable capacitor, the voltage at which arcing occurs across a capacitor ("arcing voltage") increases as the gap distance decreases. Thus, decreasing the gap distance can also reduce the likelihood of arcing. (However, as the gap distance decreases, the possibility of a dust particle causing a short between capacitor plates may increase.)

In previous vacuum variable capacitors, the gap distance has been 10 mils or greater. In accordance with the invention, the gap distance can be made smaller than 10 mils. Any decrease in gap distance below 10 mils is believed to be advantageous. In a particular embodiment of the invention, the gap distance varies between about 2 mils to about 6 mils for the expected range of capacitance variation. (In this embodiment, minimum capacitance is achieved by totally separating the capacitor plate structures so that there is no overlap between capacitor plates of the capacitor plate structures and so that the "peak separation" between peaks of capacitor plates on the opposing capacitor plate structures is about 40 mils.)

As described above, in the vacuum variable capacitor 200, the capacitance can be changed more quickly than in previous vacuum variable capacitors. More particularly, in the vacuum variable capacitor 200, capacitance can be changed on the order of 100 times as fast as in previous vacuum variable capacitors, such as the vacuum variable capacitor 100 described above with respect to FIG. 1. Illustratively, in the vacuum variable capacitor 200, capacitance changes typically require about 20 milliseconds, while in previous vacuum variable capacitors such as the vacuum variable capacitor 100, capacitance changes typically require about 2 seconds.

As indicated above, previously, capacitor plate structures have been made by brazing one or more capacitor plates on to a mounting plate. In accordance with the invention, electrical discharge machining (EDM) can be used to form from a single piece of material a capacitor plate structure that includes one or more capacitor plates on a mounting plate. This can be advantageous because EDM does not soften the material of which the capacitor plates are made as much as brazing. Consequently, the capacitor plates are more resistant to deformation, reducing the likelihood of damage to the capacitor plates that can degrade the performance of the vacuum variable capacitor or render the vacuum variable capacitor unusable.

As depicted in FIGS. 2B and 2C, each of the capacitor plates 202*a*, 203*a* and 204*a* is formed on the corresponding mounting plate 202*b*, 203*b* or 204*b* in a straight line (as viewed in a direction parallel to the axis 210). (For convenience, such capacitor plates are referred to hereinafter as "straight capacitor plates.") In contrast, in the previous vacuum variable capacitor 100 described above with respect to FIG. 1, the capacitor plates 102*a* and 103*a* are curved (i.e., formed as concentric circles on the mounting plates 102*b* and 103*b*). Similarly, in another previous vacuum variable capacitor, as described above, a capacitor plate is formed as a spiral on a mounting plate. (For convenience, such capacitor plates are referred to hereinafter as "curved capacitor plates.") The use of straight capacitor plates enables use of a particular type of EDM, wire EDM, to form a capacitor plate structure including the capacitor plates. The use of wire EDM is desirable because wire EDM is a relatively inexpensive type of EDM.

The capacitor plate structures 202, 203 and 204 can be modified so that the capacitor plates 202*a*, 203*a* and 204*a* are formed on the corresponding mounting plate 202*b*, 203*b* or 204*b* with some curvature. This can be desirable to impart additional strength to the capacitor plates 202*a*, 203*a* and 204*a* that can reduce the likelihood of deforming a capacitor plate 202*a*, 203*a* or 204*a*. However, the formation of a capacitor plate structure including curved capacitor plates requires use of a different type of EDM, probe EDM, that is more expensive than wire EDM.

As indicated above, the housing of previous vacuum variable capacitors has been made cylindrical. In contrast, as seen in FIG. 2A, the tail section 201*a* and partition 201*c* of the vacuum variable capacitor 200 have a rectangular cross-sectional shape when viewed in the direction of FIG. 2A. The rectangular cross-sectional shape of the tail section 201*a* and partition 201*c* (the edges of which extend farther from the central axis 210 of the vacuum variable capacitor 200 than the edges of the head section 201*b*, as seen in FIG. 2A) can enable the vacuum variable capacitor 200 to be integrated more compactly together with other components of a system with which the vacuum variable capacitor 200 is to be used. Additionally, since the capacitor plate structures 202, 203 and 204 are rectangular, the use of a rectangular cross-sectional shape for the tail section 201*a* and partition 201*c* enables the capacitor plate structures 202, 203 and 204 to be enclosed with a smaller tail section 201*a* and partition 201*c* than would be the case if the cross-sectional shapes of the tail section 201*a* and partition 201*c* were circular. The use of a rectangular cross-sectional shape may require that the wall thickness of the tail section 201*a* be made larger than would otherwise be the case (to accommodate stress concentrations that may occur at corners of the tail section 201*a*), but this can be an acceptable tradeoff for obtaining the benefits associated with use of a rectangular cross-sectional shape, as described above. Further, the corners of the tail section 201*a* can be rounded to relieve such stress concentrations.

The head section 201*b* of the housing 201 can have a rectangular or circular cross-sectional shape. A rectangular cross-sectional shape may facilitate more compact integration of the vacuum variable capacitor 200 with other components of a system with which the vacuum variable capacitor 200 is to be used. A circular cross-sectional shape may be desirable to facilitate design and construction of the coil and magnet, which are commonly produced in shapes having a circular cross-section.

Any of the above-described aspects of the invention can be used in a vacuum variable capacitor. Further, some aspects of the invention can be used in other capacitive devices, such as other types of vacuum capacitors or variable capacitors. Some aspects of the invention may even be usefully employed in devices other than capacitive devices.

In general, a vacuum variable capacitor according to the invention can be used for any application for which it is desired to use a vacuum variable capacitor. For example, as known to those skilled in the relevant arts, a vacuum variable capacitor according to the invention can be used in RF matching devices to vary capacitance as part of tuning the RF impedance; in semiconductor fabrication equipment; in flat panel displays; in power amplifier tank circuits; in output circuits of pi networks; in neutralizing circuits; in grid and plate blocking circuits; in antenna coupling and "rejecter" trap circuits; in magnetron output circuits for pulse shaping; in feed-through capacitors for harmonic attenuation; in dielectric heating equipment tank circuits; in non-magnetic capacitors for MRI or NMR; and in: low inductance, high current bypass applications. A vacuum variable capacitor according to the invention can particularly advantageously be used for applications in which a particular capacitance must be established quickly (e.g., on the order of milliseconds), such as, for example, applications in which it is necessary to apply a pulse (e.g., on the order of 10 milliseconds) of RF energy into a plasma.

Various embodiments of the invention have been described. The descriptions are intended to be illustrative, not limitative. Thus, it will be apparent to one skilled in the art that certain modifications may be made to the invention as described herein without departing from the scope of the claims set out below.

We claim:

1. A vacuum variable capacitor, comprising:
    a first capacitor plate structure comprising one or more capacitive surfaces;
    a second capacitor plate structure comprising one or more capacitive surfaces, wherein the first and second capacitor plate structures are positioned with respect to each other so that the capacitive surfaces of the second capacitor plate structure are spaced apart from corresponding capacitive surfaces of the first capacitor plate structure;
    means for forming a sealed enclosure, wherein:
        the sealed enclosure is held at a vacuum pressure; and
        the first and second capacitor plate structures are enclosed within the sealed enclosure; and
    means for moving the first capacitor plate structure and/or the second capacitor plate structure, such that the spacing between corresponding capacitive surfaces of the first and second capacitor plate structures changes, wherein no part of the movement means moves in opposition to a force due to a pressure differential between the inside and the outside of the sealed enclosure.

2. A vacuum variable capacitor as in claim 1, wherein all moving components of the movement means are enclosed within the sealed enclosure.

3. A vacuum variable capacitor as in claim 1, wherein the movement means further comprises:
    a coil;
    a magnet electromagnetically coupled to the coil, wherein one of the magnet and coil is movably mounted inside the sealed enclosure, and the other of the magnet and coil is mounted outside of the sealed enclosure; and
    means for connecting the one of the magnet and coil that is inside the sealed enclosure to one of the first or second capacitor plate structures that is movably mounted.

4. A vacuum variable capacitor as in claim 3, wherein the magnet is movably mounted inside the sealed enclosure.

5. A vacuum variable capacitor as in claim 3, wherein the coil is movably mounted inside the sealed enclosure.

6. A vacuum variable capacitor, comprising:
    a first capacitor plate structure comprising one or more capacitive surfaces;
    a second capacitor plate structure comprising one or more capacitive surfaces, wherein the first and second capacitor plate structures are positioned with respect to each other so that the capacitive surfaces of the second capacitor plate structure are spaced apart from corresponding capacitive surfaces of the first capacitor plate structure;
    means for forming a sealed enclosure, wherein:
        the sealed enclosure is held at a vacuum pressure; and
        the first and second capacitor plate structures are enclosed within the sealed enclosure; and
    means for moving the first capacitor plate structure and/or the second capacitor plate structure, such that the spacing between corresponding capacitive surfaces of the first and second capacitor plate structures changes, the movement means comprising:
        a coil;
        a magnet electromagnetically coupled to the coil, wherein one of the magnet and coil is movably mounted inside the sealed enclosure, and the other of the magnet and coil is mounted outside of the sealed enclosure; and
        means for connecting the one of the magnet and coil that is inside the sealed enclosure to one of the first or second capacitor plate structures that is movably mounted.

7. A vacuum variable capacitor as in claim 6, wherein the magnet is movably mounted inside the sealed enclosure.

8. A vacuum variable capacitor as in claim 6, wherein the coil is movably mounted inside the sealed enclosure.

9. A vacuum variable capacitor as in claim 6, further comprising an electrically conductive partition positioned within the sealed enclosure to separate the first and second capacitor plate structures from the one of the magnet and coil that is movably mounted inside the sealed enclosure.

10. A vacuum variable capacitor, comprising:
    a first capacitor plate structure comprising one or more capacitive surfaces;
    a second capacitor plate structure comprising one or more capacitive surfaces, wherein the first and second capacitor plate structures are positioned with respect to each other so that the capacitive surfaces of the second capacitor plate structure are spaced apart from corresponding capacitive surfaces of the first capacitor plate structure;
    a third capacitor plate structure comprising one or more capacitive surfaces, wherein the first and third capacitor plate structures are positioned with respect to each other so that the capacitive surfaces of the third capacitor plate structure are spaced apart from corresponding capacitive surfaces of the first capacitor plate structure;
    means for forming a sealed enclosure, wherein:
        the sealed enclosure is held at a vacuum pressure; and
        the first, second and third capacitor plate structures are enclosed within the sealed enclosure; and
    means for moving the first capacitor plate structure, the second capacitor plate structure and/or the third capacitor plate structure, such that the spacing between corresponding capacitive surfaces of the first and second capacitor plate structures and/or the first and third capacitor plate structures changes.

11. A vacuum variable capacitor as in claim 10, wherein the movement means moves the first capacitor plate structure.

12. A vacuum variable capacitor, comprising:
a first capacitor plate structure comprising one or more capacitive surfaces;
a second capacitor plate structure comprising one or more capacitive surfaces, wherein the first and second capacitor plate structures are positioned with respect to each other so that the capacitive surfaces of the second capacitor plate structure are spaced apart from corresponding capacitive surfaces of the first capacitor plate structure;
a housing, wherein:
the housing includes a sealed enclosure formed therein, the sealed enclosure being held at a vacuum pressure;
the first and second capacitor plate structures are enclosed within the sealed enclosure, the first capacitor plate structure and/or the second capacitor plate structure being movably mounted therein to enable movement along an axis; and
the housing has a rectangular cross-sectional shape in at least one plane that is perpendicular to the axis along which the first and/or second capacitor plate structure can move; and
means for moving the first capacitor plate structure and/or the second capacitor plate structure, such that the spacing between corresponding capacitive surfaces of the first and second capacitor plate structures changes.

13. A vacuum variable capacitor as in claim 12, wherein the at least one plane includes a plane including the edges of the housing which extend farthest from a central axis of the vacuum variable capacitor.

14. A vacuum variable capacitor as in claim 12, wherein:
the movement means further comprises a coil and a magnet electromagnetically coupled to the coil, wherein the magnet and coil are mounted inside and/or around the housing; and
the part of the housing within or around which the magnet and coil are mounted has a circular cross sectional shape in at least one plane that is perpendicular to the axis along which the first and/or second capacitor plate structure can move.

15. A vacuum variable capacitor, comprising:
a first capacitor plate structure, comprising:
a mounting plate;
one or more capacitor plates having opposed capacitive surfaces, each capacitor plate being formed on the mounting plate such that each of the capacitive surfaces of the capacitor plate lie in a plane;
a second capacitor plate structure, comprising:
a mounting plate;
one or more capacitor plates having opposed capacitive surfaces, each capacitor plate being formed on the mounting plate such that each of the capacitive surfaces of the capacitor plate lie in a plane, wherein:
the first and second capacitor plate structures are positioned with respect to each other so that the capacitive surfaces of the second capacitor plate structure are spaced apart from corresponding capacitive surfaces of the first capacitor plate structure;
means for forming a sealed enclosure, wherein:
the sealed enclosure is held at a vacuum pressure; and
the first and second capacitor plate structures are enclosed within the sealed enclosure; and
means for moving the first capacitor plate structure and/or the second capacitor plate structure, such that the spacing between corresponding capacitive surfaces of the first and second capacitor plate structures changes.

16. A vacuum variable capacitor as in claim 15, wherein the first and second capacitor plate structures are constructed by performing electrical discharge machining to form the one or more capacitor plates on the mounting plate.

17. A vacuum variable capacitor, comprising:
a first capacitor plate structure, comprising:
a mounting plate;
one or more capacitor plates having opposed capacitive surfaces, each capacitor plate being formed on the mounting plate such that each of the capacitive surfaces is not perpendicular to the surface of the mounting plate on which the capacitor plates are mounted;
a second capacitor plate structure, comprising:
a mounting plate;
one or more capacitor plates having opposed capacitive surfaces, each capacitor plate being formed on the mounting plate such that each of the capacitive surfaces is not perpendicular to the surface of the mounting plate on which the capacitor plates are mounted, wherein:
the first and second capacitor plate structures are positioned with respect to each other so that the capacitive surfaces of the second capacitor plate structure are spaced apart from corresponding capacitive surfaces of the first capacitor plate structure;
means for forming a sealed enclosure, wherein:
the sealed enclosure is held at a vacuum pressure; and
the first and second capacitor plate structures are enclosed within the sealed enclosure; and
means for moving the first capacitor plate structure and/or the second capacitor plate structure, such that the spacing between corresponding capacitive surfaces of the first and second capacitor plate structures changes.

* * * * *